(12) United States Patent  
Lindrose

(10) Patent No.: US 6,744,605 B2  
(45) Date of Patent: Jun. 1, 2004

(54) LOW-PROFILE PIVOT ASSEMBLY

(75) Inventor: Albert Michael Lindrose, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 112 days.

(21) Appl. No.: 10/119,789

(22) Filed: Apr. 10, 2002

(65) Prior Publication Data

US 2002/0150019 A1 Oct. 17, 2002

Related U.S. Application Data

(60) Provisional application No. 60/282,798, filed on Apr. 10, 2001.

(51) Int. Cl.$^7$ .............................................. G11B 5/55
(52) U.S. Cl. .............................. 360/265.2; 360/265.4; 360/265.6; 384/517; 384/613
(58) Field of Search .......................... 360/265.2–265.6; 384/613, 517

(56) References Cited

U.S. PATENT DOCUMENTS

| | | | |
|---|---|---|---|
| 2,819,127 A | | 1/1958 | Grobey |
| 3,061,822 A | | 10/1962 | Mitchell |
| 4,555,189 A | | 11/1985 | Donkin |
| 4,618,271 A | * | 10/1986 | Li .................. 384/461 |
| 5,260,846 A | | 11/1993 | Iriko et al. |
| 5,394,283 A | | 2/1995 | Hans et al. |
| 5,510,940 A | * | 4/1996 | Tacklind et al. ........ 360/265.6 |
| 5,768,060 A | | 6/1998 | Albrecht et al. |
| 5,835,309 A | | 11/1998 | Boutaghou |
| 6,651,633 B1 | * | 11/2003 | Jones .................. 123/559.1 |

* cited by examiner

Primary Examiner—A. J. Heinz  
(74) Attorney, Agent, or Firm—Derek J. Berger

(57) ABSTRACT

A low-profile pivot assembly is disclosed. The assembly includes two generally coaxial bearings having differing diameters so as to define inner and outer bearings. This arrangement permits the pivot assembly to be constructed with a lower profile than conventional pivot bearings. These and other and benefits will become apparent upon a review of the attached figures and the accompanying description.

19 Claims, 4 Drawing Sheets

LOW-PROFILE PIVOT ASSEMBLY

CROSS-REFERENCE TO RELATED APPLICATIONS

This application claims the benefit of U.S. Provisional Application No. 60/282,798, filed Apr. 10, 2001.

FIELD OF THE INVENTION

This invention relates generally to the field of hard disc drive data storage devices, and more particularly, but not by way of limitation, to rotational support of disc drive actuators.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 15,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative pneumatic relationship with a thin layer of air dragged along by the spinning discs to fly the head assembly in a closely spaced relationship to the disc surface. In order to maintain the proper flying relationship between the head assemblies and the discs, the head assemblies are attached to and supported by flexures attached to the actuator.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. The actuator is mounted to the pivot shaft by precision ball bearing assemblies within a bearing housing. The actuator supports a flat coil which is suspended in the magnetic field of an array of permanent magnets, which are fixedly mounted to the disc drive housing base member.

On the side of the actuator bearing housing opposite to the coil, the actuator assembly typically includes a plurality of vertically aligned, radially extending actuator head mounting arms, to which the head suspensions mentioned above are mounted. These actuator arms extend between the discs, where they support the head assemblies at their desired positions adjacent the disc surfaces. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved generally radially across the data tracks of the discs along an arcuate path.

In the past, disc drives were typically used for storage of data in personal computers and in storage arrays for storing huge amounts of data in enterprise applications. Presently, however, drives are being contemplated for use in a wide variety of consumer products, such as television set-top video recorders, video game consoles, and hand-held computers. These applications present a new set of challenges to the drive industry, requiring that drives be more quiet and smaller than ever before. In particular, there is a need to produce drives having a height which is decreased relative to that of conventional drives to enable use in hand-held and card-type applications.

A primary factor in limiting potential decreases in drive height is the actuator pivot. A typical pivot mechanism has two ball bearing assemblies having ball bearings which roll between inner and outer races, a stationary shaft attached to the inner races and a rotating sleeve attached to the outer races. The sleeve is typically secured within a bore in the actuator body and the stationary shaft typically is attached to the base deck and the top cover of the disc drive. The bearings are preloaded such that the inner races are forced toward one another. The inner and outer races of each bearing assembly are thereby slightly offset so as to take up radial clearances built into the bearing assemblies. Without preload, the sleeve would be more free to move along the pivot axis, to translate horizontally or to pivot about a horizontal axis, causing unwanted head movement. In addition, lack of preload would lead to unwanted vibrations, contributing to the likelihood of resonance within the actuator system. It is the provision of two bearing assemblies which allows preload. However, one disadvantage of this arrangement is that absolute minimum drive height is limited by the combined height of the two bearing assemblies in addition to the vertical spacing between them.

What the prior art has been lacking is a low profile actuator pivot assembly which is easily assembled, inexpensive and which exhibits adequate stiffness to prevent excess vibration of the actuator assembly.

SUMMARY OF THE INVENTION

The present invention is directed to a low-profile actuator pivot bearing assembly. The assembly includes two generally coaxial bearings having differing diameters so as to define inner and outer bearings. This arrangement permits the pivot assembly to be constructed with a lower profile than conventional pivot bearings. These and other and benefits will become apparent upon a review of the attached figures and the accompanying description.

DETAILED DESCRIPTION OF THE INVENTION

Figure 1:
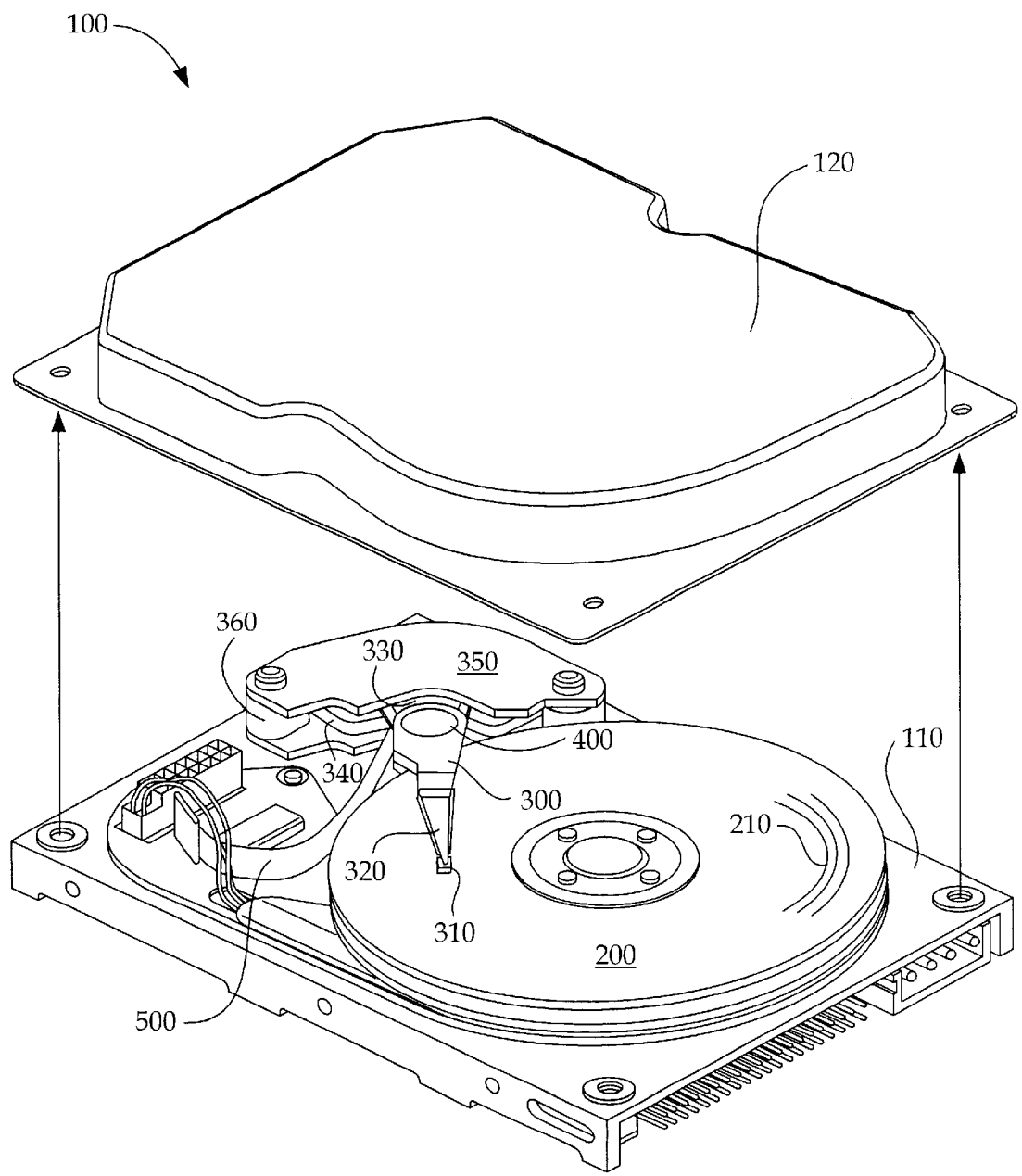
FIG. 1 shows an exploded view of a disc drive incorporating the bearing mounting assembly of the present invention.

Turning now to the drawings and specifically to FIG. 1, shown is an exploded view of an example of a disc drive 100 in which the present invention is particularly useful. Of course, the illustrated drive is merely exemplary in nature; the pivot assembly 400 of the present invention may be utilized in any number of storage devices. It is further contemplated that the disclosed pivot assembly 400 may be implemented in other device requiring pivotal mounting of a rotating element. The illustrated disc drive 100 includes a base 110 to which all other components are directly or indirectly mounted and a top cover 120 which, together with the base 110, forms a disc drive housing which encloses delicate internal components and isolates these components from external contaminants.

The illustrated disc drive 100 includes a plurality of discs 200 which are mounted for rotation on a spindle motor (not shown). The discs 200 include on their surfaces a plurality of circular, concentric data tracks 210 on which data are recorded via an array of vertically aligned head assemblies (one of which is shown at 310). The head assemblies 310 are supported by flexures 320, which are attached to arm portions of actuator 300. The actuator 300 is mounted to a pivot assembly 400 about which the actuator 300 rotates.

Power to drive the actuator 300 about the pivot assembly 400 is provided by a voice coil motor (VCM). The VCM consists of a coil 330 which is supported by the actuator 300 within the magnetic field of a permanent magnet assembly having spaced upper and lower magnets 340. The magnets 340 may be mounted to spaced pole pieces 350 which may be fixed to the deck 110 and spaced from one another by spacers 360. Electronic circuitry is provided on a printed circuit board (PCB, not shown) mounted to the underside of the deck 110. Control signals to drive the VCM are carried between the PCB and the moving actuator 300 via a flexible printed circuit cable (PCC) 500, which also transmits data signals to and from the heads 310.

Figure 2:
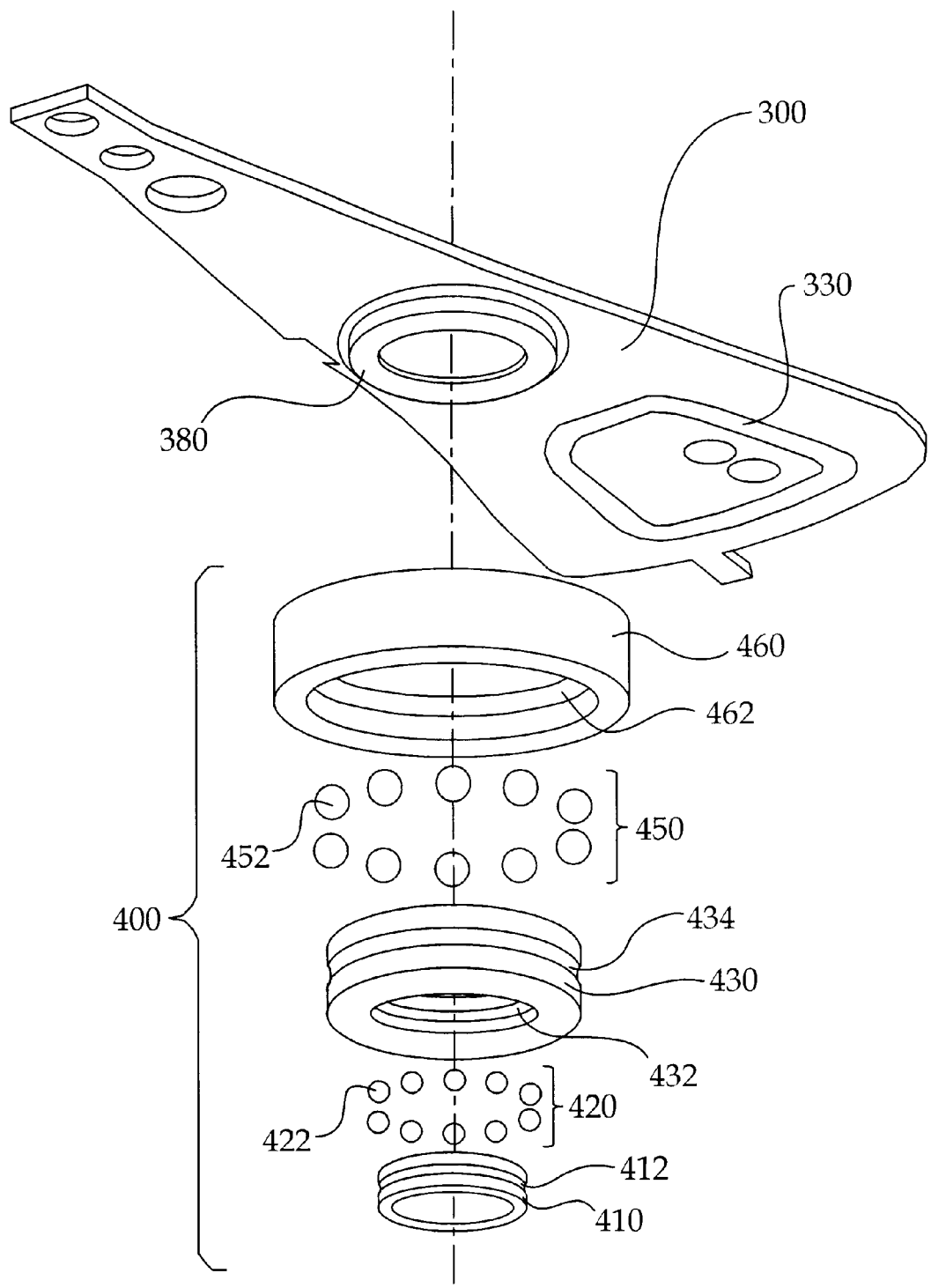
FIG. 2 shows an exploded view of an actuator incorporating an embodiment pivot assembly of the present invention.

FIG. 2 shows an exploded view of an embodiment of a low-profile actuator pivot assembly 400 in combination with an actuator 300. In one embodiment of the invention illustrated here, the actuator 300 is a "single-stage" actuator, meaning it has only one arm and may be, as in this case, generally planar.

As shown in FIG. 2, pivot assembly 400 includes two bearings 420,450, each comprising a number of balls 422, 452. The balls 422 are positioned between an innermost sleeve 410 and an intermediate sleeve 430. The innermost sleeve 410 does not rotate and includes a raceway 412. Intermediate sleeve 430 includes an inner raceway 432 and is fixed to the actuator 300. Balls 422 roll within raceways 412,432 such that intermediate sleeve 430 is free to rotate about fixed innermost sleeve 410. Because actuator 300 is fixed to the intermediate sleeve, the actuator 300 is also free to rotate.

Balls 452 are positioned between an outermost sleeve 460 and the intermediate sleeve 430. The outermost sleeve 460 does not rotate and includes a raceway 462. Intermediate sleeve 430 includes an outer raceway 434. Balls 452 roll within raceways 462,434 such that intermediate sleeve 430 is free to rotate within outermost sleeve 460. As mentioned above, the actuator 300 is fixed to the intermediate sleeve 430 and is also free to rotate about a vertical axis.

Figure 3:
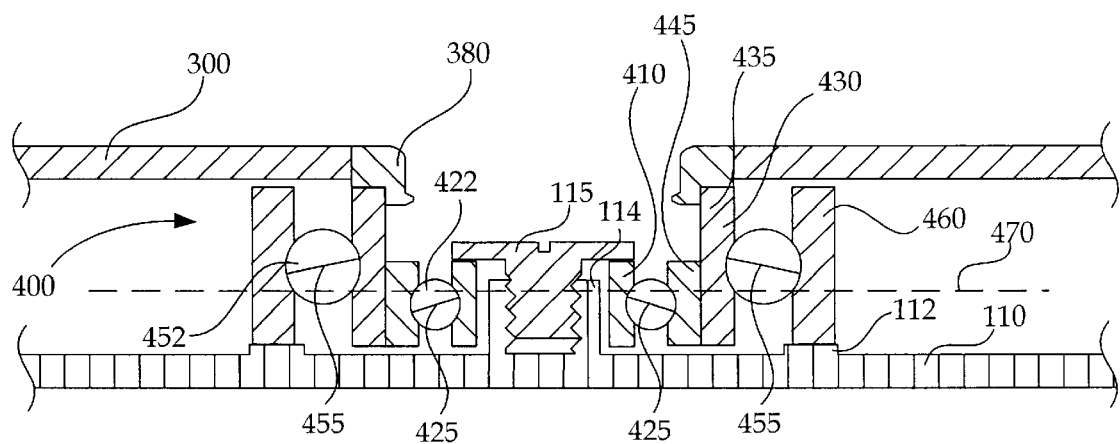
FIG. 3 depicts a cross-sectional view of an actuator mounted to one embodiment of a pivot assembly.

FIG. 3 depicts a cross-sectional view of one embodiment of the present invention. Balls 422 make up lower bearing 420, while balls 452 make up upper bearing 450. Unlike conventional pivots, however, in which upper and lower bearings are vertically spaced and have identical dimensions, the upper and lower bearings of FIG. 3 have different dimensions. Upper bearing 450 has a diameter which is greater than that of lower bearing 420. This arrangement permits the vertical spacing between the upper and lower bearings 420,450 to be significantly reduced relative to conventional pivots. In fact, portions of upper and lower bearings 420,450 may even share a common horizontal plane, such as the one designated 470 in FIG. 3. As such, the height of pivot assembly 400 is capable of being constructed with an overall height significantly lower than that of conventional pivots.

Another advantage of this arrangement is that outer balls 452 can be made larger than inner balls 422 as illustrated in FIG. 3. Use of larger balls increases axial, and radial and rotational stiffness of the pivot assembly 400.

FIG. 3 also shows one embodiment of an intermediate sleeve 430. In this embodiment, outer raceway 434 is formed in an outer sleeve 435 while inner raceway 432 is formed in an inner sleeve 445. Inner and outer sleeves 445,435 may be manufactured separately and fixed together in any of a number of ways. For example, adhesives may be used to fasten them together, or inner sleeve 445 may be press-fit, welded, or attached by conventional mechanical fasteners such as screws within outer sleeve 435. It should also be recognized that intermediate sleeve 430 may instead be manufactured as a single piece so as to reduce parts and assembly steps. Such a sleeve could have integrally formed portions 435,445 or could take the form of a single sleeve such as 445 having inner and outer raceways 432,434 formed therein. What is important is that intermediate sleeve 430 have inner and outer raceways 432,434 which are vertically spaced from one another.

FIG. 3 also depicts one method for attaching an actuator 300 or other rotatable element to pivot assembly 400. In this embodiment, actuator 300 includes an aperture aligned with the axis of rotation of the pivot assembly 400. A portion 380 of the actuator 300 surrounding the aperture is deformed so as to be expanded against an inner surface of the intermediate sleeve 430. This type of operation is known as "swaging." However, it is also contemplated that the actuator 300 could be attached to intermediate sleeve 430 by other means, such as adhesive, welding, or conventional mechanical fasteners such as screws. Portion 380 could also be formed as a protrusion so as to facilitate a simple press-fit within intermediate sleeve 430 is swaged to intermediate sleeve 430.

FIG. 3 also shows one arrangement for effecting preload of the pivot assembly 400. Preloading is a procedure by which inner and outer races of each bearing are slightly offset from one another so as to take up radial clearances built into the bearing assemblies. If these clearances were to remain, intermediate sleeve 430 would be free to move in undesirable ways. Small amounts of vertical and horizontal translation would be possible, as would rocking about a horizontal axis, causing unwanted movement of actuator 300. Where applied in a disc drive, a supported read/write head would also move uncontrollably, causing read/write errors, head-disc contact and even catastrophic drive failure. In addition, lack of preload would lead to unwanted vibrations, contributing to the likelihood of resonance within the actuator system. As seen in FIG. 3, base 110 may be provided with a circular land portion 112 as well as a threaded bore 114. As an initial step for installing pivot assembly 400 within on the deck, outermost sleeve 460 is aligned with and lowered onto land 112. Innermost sleeve 410 is simultaneously lowered about coaxial threaded bore 114. Threaded member 115 is then threaded into bore 114. Threaded member 115 includes a head portion which contacts an upper surface of innermost sleeve 410 as threaded member 115 descends into bore 114. Innermost sleeve 410 is thereby forced downwardly until clearances are removed from between balls 422,452 and their respective raceways 412,432,434,462. This causes balls 422,452 to loaded against the curved surfaces of their respective raceways 412,432,434,462, such that a line of force is set up a small angle, called a "contact angle," relative to the horizontal plane of the bearing. For purposes of illustration, approximations of the contact angles are illustrated in FIG. 3 as lines 425 and 455. One advantage of the preload arrangement of FIG. 3 is that preload may be adjusted easily by simply turning fastener 115. Thus one pivot assembly 300 may be suitable for a variety of different applications requiring different preloads.

Figure 4:
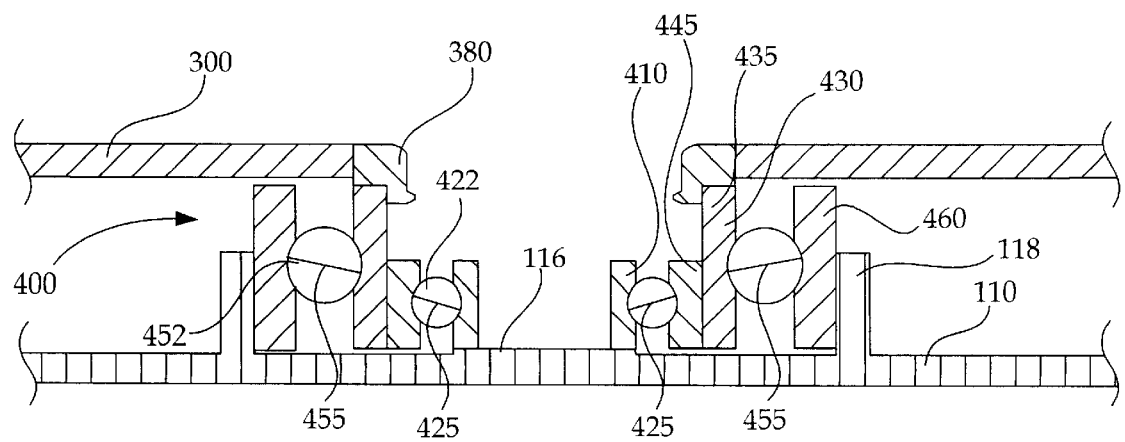
FIG. 4 shows a cross-sectional view of an actuator mounted to another embodiment of a pivot assembly.

FIG. 4 depicts an embodiment of pivot assembly 400 in which preload is applied in a manner different from that shown in FIG. 3. In this embodiment, base 110 is provided with a central land portion 116 as well as a cylindrical wall 118. As an initial step for installing pivot assembly 400 on the base 110, innermost sleeve 410 is aligned with and lowered onto land 116. Outermost sleeve 460 is simultaneously lowered within coaxial cylindrical wall 118. The outer surface of outermost sleeve 460 is dimensioned to fit closely within the inner surface of wall 118, and is configured to be secured to it by any of a number of methods, such as press-fitting, adhesive, threads or some other appropriate fastener. The outermost sleeve 460 is pressed downwardly until the desired preload is reached, taking up the clearances between balls 422,452 and their respective raceways 412, 432,434,462. If press-fit, assembly is complete and downward pressure is removed from outermost sleeve 460. Otherwise, the fastening means is applied, after which assembly is complete and only then is downward pressure removed from the outermost sleeve 460. For purposes of illustration, approximations of the contact angles are illustrated in FIG. 4 as lines 425 and 455. Note that the contact angles in FIG. 4 are sloped oppositely to those of FIG. 3.

Figure 5:
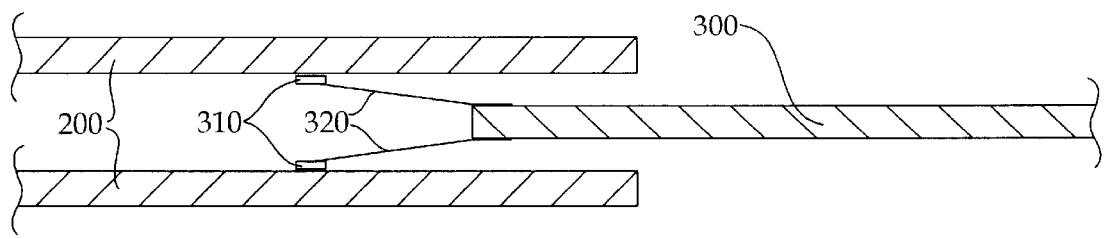
FIG. 5 depicts a cross-sectional view of an embodiment in which two discs may be accessed by head assemblies.
Figure 6:
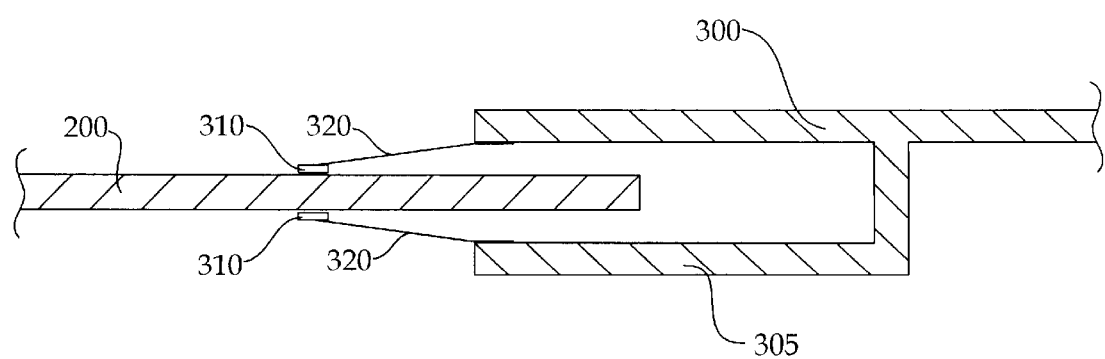
FIG. 6 depicts a cross-sectional view of another embodiment in which two surfaces of the same disc may be accessed by head assemblies.

Of course, it should be understood that the device described herein may be modified without departing from the spirit of the invention. For example, while a single, planar actuator arm 300 is advantageous for its ease of manufacture, low profile and low inertia, it is contemplated that additional arms 305 could be added for the purpose of accessing additional disc surfaces as shown in FIG. 6. It is also contemplated that actuator 300 could be provided with two heads 310 and support assemblies 320 and installed between two discs 200 as in FIG. 5, so as to allow access to two disc surfaces while maintaining the advantages described above with respect to a single, planar actuator.

Alternatively characterized, a first contemplated embodiment of the invention takes the form of a pivot assembly (such as 400) including a stationary outer annular element (such as 460), a stationary inner element (such as 410) extending along an axis of the outer element (such as 460), and a rotatable annular element (such as 430) coaxial with and intermediate the inner and outer elements (such as 410,460). A first plurality of balls (such as 420) is positioned between the inner and intermediate elements (such as 410, 430) and a second plurality of balls (such as 450) is positioned between the outer and intermediate elements (such as 460,430). The first plurality of balls (such as 420) may lie in a first plane and centers of the second plurality of balls (such as 450) may lie in a second plane spaced from the first plane. A portion of each ball (such as 422,452) of the first and second plurality of balls (such as 420,450) may lie in a common plane (such as 470). Each of the second plurality of balls (such as 450) may have a diameter greater than a diameter of each of the first plurality of balls (such as 420). The inner, outer and intermediate elements (such as 410,460,430) may exert a preload on each ball (such as 422,452) of the first and second plurality of balls (such as 420,450). The pivot assembly (such as 400) may be implemented in a disc drive (such as 100) having a base (such as 110) and an actuator (such as 300), in which the outer and inner elements (such as 460,410) are mounted to the base (such as 110) and the actuator (such as 300) is mounted to the intermediate element (such as 430). In this embodiment, the outer and inner elements (such as 460,410) may exert a preload on each ball (such as 422,452) of the first and second plurality of balls (such as 420,450).

Alternatively characterized, a second contemplated embodiment of the invention takes the form of a disc drive (such as 100) including a base (such as 110), an actuator (such as 300) and a pivot assembly (such as 400) for rotatably mounting the actuator (such as 300) to the base (such as 110). The pivot assembly (such as 400) includes a stationary annular outer element (such as 460) mounted to the base (such as 110), an annular inner element (such as 430) coaxial with and rotatable with respect to the outer element (such as 460). The actuator (such as 300) is mounted to the inner annular element (such as 430). A first plurality of balls (such as 450) is positioned between the inner and outer annular elements (such as 430,460). A preload member is positioned within the inner annular element (such as 430) and is configured to exert a preload on each of the first plurality of balls (such as 450). The preload member may take the form of an innermost element (such as 410) mounted to the base (such as 110) and a second plurality of balls (such as 420) positioned between the inner element (such as 430) and the innermost element (such as 410). Optionally the disc drive (such as 100) may further include a threaded bore (such as 114) in the base (such as 110) and a threaded member (such as 115) configured to exert a force on the preload member as the threaded member (such as 115) is rotated within the threaded bore (such as 114). Each of the first plurality of balls (such as 450) may have a diameter greater than a diameter of each of the second plurality of balls (such as 420). The inner annular element (such as 430) may take the form of a first sleeve (such as 445) fixedly mounted within a second sleeve (such as 435). The inner annular element (such as 430) may include a first raceway (such as 434) engaging the first plurality of balls (such as 450) and a second raceway (such as 432) engaging the second plurality of balls (such as 420). Optionally, the actuator (such as 300) may be swaged to the inner annular element (such as 430).

From the foregoing, it is apparent that the present invention is particularly suited to provide the benefits described above. While particular embodiments of the invention have been described herein, modifications to the embodiments which fall within the envisioned scope of the invention may suggest themselves to one of skill in the art who reads this disclosure.

We claim:

1. A pivot assembly comprising:
   a stationary outer annular element;
   a stationary inner element extending along an axis of the outer element;
   a rotatable intermediate annular element coaxial with and intermediate the inner and outer elements;
   a first plurality of balls positioned between the inner and intermediate elements; and
   a second plurality of balls positioned between the outer and intermediate elements.

2. The pivot assembly of claim 1, in which centers of the first plurality of balls lie in a first plane and centers of the second plurality of balls lie in a second plane spaced from the first plane.

3. The pivot assembly of claim 1, in which a portion of each ball of the first and second plurality of balls lies in a common plane.

4. The pivot assembly of claim 1, in which each of the second plurality of balls has a diameter greater than a diameter of each of the first plurality of balls.

5. The pivot assembly of claim 1, in which the inner, outer and intermediate elements exert a preload on each ball of the first and second plurality of balls.

6. The disc drive of claim 5, in which the outer and inner elements exert a preload on each ball of the first and second plurality of balls.

7. A disc drive comprising the pivot assembly of claim 1, the disc drive further comprising:
   a base; and
   an actuator, in which the outer and inner elements are mounted to the base and the actuator is mounted to the intermediate element.

8. A disc drive comprising:
   a base;
   an actuator; and
   a pivot assembly for rotatably mounting the actuator to the base, the pivot assembly comprising:
      a stationary annular outer element mounted to the base;
      an annular inner element positioned within coaxial, with and rotatable with respect to the outer element, the actuator being mounted to the inner annular element;
      a first plurality of balls positioned between the inner and outer annular elements; and
      a preload member positioned within the inner annular element, the preload member being configured to exert a preload on each of the first plurality of balls.

9. The disc drive of claim 8, further comprising:
   a threaded bore in the base; and
   a threaded member configured to exert a force on the preload member as the threaded member is rotated within the threaded bore.

10. The disc drive of claim 8, in which the preload member comprises:
    art innermost element mounted to the base; and
    a second plurality of balls positioned between the inner element and the innermost element.

11. The disc drive of claim 10, in which each of the first plurality of balls has a diameter greater than a diameter of each of the second plurality of balls.

12. The disc drive of claim 10, in which the inner annular element comprises a first sleeve fixedly mounted within a second sleeve.

13. The disc drive of claim 10 in which the inner annular element comprises a first raceway engaging the first plurality of balls and a second raceway engaging the second plurality of balls.

14. The disc drive of claim 8 in which the actuator is swaged to the inner annular element.

15. A disc drive comprising:
    a base;
    an actuator; and
    means for pivotally mounting the actuator to the base.

16. The disc drive of claim 15, in which the mounting means comprises:
    first and second annular bearings having different diameters.

17. The disc drive of claim 15, in which the mounting means comprises:
    first and second pluralities of balls, each of the first plurality of balls having a diameter different than a diameter of each of the second plurality of balls.

18. The disc drive of claim 15, in which the mounting means comprises:
    inner, outer and intermediate sleeves, the actuator being mounted to the intermediate sleeve.

19. The disc drive of claim 15, in which the mounting means comprises:
    a rotating element, the actuator being swaged to the rotating element.

* * * * *